US011980203B2

(12) United States Patent
Engelke et al.

(10) Patent No.: US 11,980,203 B2
(45) Date of Patent: May 14, 2024

(54) DRY-POWDERED CHEESE COMPOSITIONS WITH NATURALLY-DERIVED COLOR BLENDS, METHOD OF MAKING AND CHEESE PRODUCT

(71) Applicant: Kraft Foods Group Brands LLC, Chicago, IL (US)

(72) Inventors: Amber Lynne Engelke, Glenview, IL (US); Bridget Colleen McClatchey, Chicago, IL (US); John Benjamin Topinka, Evanston, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 805 days.

(21) Appl. No.: 15/567,890

(22) PCT Filed: Apr. 19, 2016

(86) PCT No.: PCT/US2016/028274
§ 371 (c)(1),
(2) Date: Oct. 19, 2017

(87) PCT Pub. No.: WO2016/172100
PCT Pub. Date: Oct. 27, 2016

(65) Prior Publication Data
US 2018/0098551 A1    Apr. 12, 2018

Related U.S. Application Data

(60) Provisional application No. 62/149,957, filed on Apr. 20, 2015.

(51) Int. Cl.
| | | |
|---|---|---|
| A23C 19/09 | (2006.01) | |
| A23C 19/082 | (2006.01) | |
| A23C 19/086 | (2006.01) | |
| A23C 20/00 | (2006.01) | |
| A23L 5/43 | (2016.01) | |
| A23L 5/44 | (2016.01) | |
| A23L 23/00 | (2016.01) | |
| A23L 23/10 | (2016.01) | |
| A23P 10/40 | (2016.01) | |
| A23P 10/47 | (2016.01) | |

(52) U.S. Cl.
CPC ........ *A23C 19/0925* (2013.01); *A23C 19/082* (2013.01); *A23C 19/086* (2013.01); *A23C 19/0904* (2013.01); *A23C 20/00* (2013.01); *A23L 5/43* (2016.08); *A23L 5/44* (2016.08); *A23L 23/00* (2016.08); *A23L 23/10* (2016.08); *A23P 10/40* (2016.08); *A23P 10/47* (2016.08)

(58) Field of Classification Search
CPC .. A23K 19/025; A23K 19/082; A23K 19/086; A23L 5/43; A23L 5/44
See application file for complete search history.

(56) References Cited

U.S. PATENT DOCUMENTS

| | | | | |
|---|---|---|---|---|
| 4,304,792 A | * | 12/1981 | Sreenivasan | A23D 7/0053 426/250 |
| 4,574,086 A | * | 3/1986 | Shackelford | A23L 27/70 426/262 |
| 4,853,232 A | * | 8/1989 | Subramaniam | A23C 19/063 426/35 |
| 4,898,739 A | * | 2/1990 | Subramaniam | A23C 19/063 426/35 |
| 5,935,633 A | * | 8/1999 | Derian | A23C 19/086 426/518 |
| 6,171,602 B1 | * | 1/2001 | Roman | A61K 8/26 424/401 |
| 6,251,445 B1 | | 6/2001 | Xiao-Qing et al. | |
| 2005/0129825 A1 | | 6/2005 | Gray | |

(Continued)

FOREIGN PATENT DOCUMENTS

| | | |
|---|---|---|
| CN | 1169825 | 1/1998 |
| CN | 102318684 | 1/2012 |

(Continued)

OTHER PUBLICATIONS

Lucey, J.A., Maurer-Rothmann, A., Kaliappan, S. 2011. "Functionality of Ingredients: Emulsifying Salts." in Processed Cheese and Analogs. pp. 110-132.*
Watson, E. 2012. "Open Innovation: What is Kraft Foods looking for from potential partners?" Downloaded Sep. 19, 2019, from https://www.foodnavigator-usa.com/Article/2012/06/08/Open-innovation-What-is-Kraft-Foods-looking-for-from-partners#.*
Campbell, R.E., Boogers, I.A.L.A., Drake, M.A. 2014. "Short communication: Development of a novel method for the extraction of norbixin from whey and its subsequent quantification via high performance liquid chromatography." J. Dairy Sci. vol. 97, pp. 1313-1318.*
Reith, J.F., Gielen, J.W. 1971. "Properties of Bixin and Norbixin and the Composition of Annatto Extracts." J. Food Sci. vol. 36, pp. 861-864.*

(Continued)

*Primary Examiner* — Nikki H. Dees
(74) *Attorney, Agent, or Firm* — Fitch, Even, Tabin & Flannery LLP

(57) ABSTRACT

According to embodiments, dry powdered compositions which may be reconstituted to provide a cheese product include at least one cheese component and a color blend. In some embodiments, the color blend includes from about 49.7% to about 87.1% curcumin compounds by weight based on a total amount of a color portion of the color blend; from about 2.1% to about 42.8% annatto carotenoids by weight based on the total amount of the color portion of the color blend; and from about 7.5% to about 10.8% paprika carotenoids by weight based on the total amount of the color portion of the color blend. In embodiments, the powdered composition includes from about 38.5 ppm to about 733.9 ppm curcumin compounds by weight based on the powdered composition; from about 3.6 ppm to about 165.7 ppm annatto carotenoids by weight based on the powdered composition; and from about 5.8 ppm to about 90.7 ppm paprika carotenoids by weight based on the powdered composition.

26 Claims, No Drawings

(56) References Cited

U.S. PATENT DOCUMENTS

| | | | |
|---|---|---|---|
| 2005/0226985 A1 | 10/2005 | Landon et al. | |
| 2007/0141217 A1 | 6/2007 | Benedict et al. | |
| 2009/0069386 A1* | 3/2009 | Dairiki | A01N 25/02 |
| | | | 514/341 |
| 2012/0014934 A1 | 1/2012 | Altaffer et al. | |
| 2014/0154388 A1 | 6/2014 | Atapattu et al. | |

FOREIGN PATENT DOCUMENTS

| | | |
|---|---|---|
| CN | 102334558 | 2/2012 |
| CN | 102687757 | 9/2012 |
| ES | 2365566 | 10/2011 |
| JP | 2001218568 A | 8/2001 |
| RU | 72817 | 5/2008 |
| WO | 1999007233 A1 | 2/1999 |
| WO | 2008032006 A1 | 3/2008 |
| WO | 2014087058 | 6/2014 |
| WO | 2016172100 A1 | 10/2016 |

OTHER PUBLICATIONS

Smith, T.J., Li, X.E., Drake, M.A. 2014. "Short communication: Norbixin and bixin partitioning in Cheddar cheese and whey." J. Dairy Sci. vol. 97, pp. 3321-3327.*

Oliveman. "Make a better blue box Mac and Cheese (Without any extra ingredients)." 2012. Downloaded Jul. 1, 2021 from https://www.instructables.com/Make-a-better-blue-box-Mac-and-Cheese-Without-any/. 8 pages.*

Maga, J.A., et al., "Stability of Natural Colourants (Annatto, Beet, Paprika, Turmeric) During Extrusion Cooking," 23 Food Sci. Tech. 5, 1 page (1990).

Database GNPD [Online] Mintel; Nov. 2011 (Nov. 2011), Bear Creek Country Kitchens: "Alfredo Pasta Mix", Database accession No. 1658415.

Database GNPD [Online] Mintel; Apr. 2014 (Apr. 2014), Snyder's of Hanover: "Cheddar Cheese Pretzel Pieces", Database accession No. 2397767.

Chili Mac & Cheese from Sheetz, https://www.nutritionix.com/sheetz/chili-mac-cheese, accessed Feb. 24, 2015.

Database GNPD [Online] Mintel; Mar. 2015 (Mar. 2015), Perfect Fit Meals: "Chicken Carbonara with Cauliflower Bacon Sauce and Pasta", Database accession No. 3056541.

International Preliminary Report on Patentability PCT/US2016/028274; International filing date Apr. 19, 2016; 8 pages.

Database GNPD [Online] Mintel; Feb. 2013 (Feb. 2013), Johnny's Fine Foods: "Potato Cheddar Soup Mix", Database accession No. 1986306.

Examination Report dated Jul. 19, 2019 for EP Application No. 16721025.1.

Wilson, Kraft removing artificial dyes from some mac and cheese, https://web.archive.org/web/20131216080327/http://edition.cnn.com/2013/11/01/health/kraft-macaroni-cheese-dyes/?, 2013, 3 pages.

Brimmer, Formulation Strategies for Cheese Powder & Sauce, https://web.archive.org/web/20150524010804/http://www.sensientfoodcolors.com/colorinsight/formulation-strategies-for-cheese-powder-sauce/, 2015 Sensient Food Colors, 2 pages.

Shallow, Kraft removing artificial dyes, preservatives from Mac & Cheese, http://www.cbsnews.com/news/kraft-removing-artificial-dyes-preservatives-from-mac-cheese/, 2015, 16 pages.

Chr. Hansen, Continental Cheese Types, http://www.chr-hansen.com/fileadmin/user_upload/3.Download_documents/7._Technical_Brochures_CWC/Technical_Brochure_Continental.pdf, retrieved on Feb. 24, 2012, 24 pages.

Office Action dated Oct. 29, 2019 for RU Application No. 2017137274.

Examination Report dated Aug. 15, 2019 for AU Application No. 2016252280.

Anonymous, "Turmeric Oleoresin", Jan. 1, 1989, pp. 1-3, XP055752286, URL:http://www.fao.org/fileadmin/user_upload/jecfa_additives/docs/Monograph1 /Additive-484.pdf.

European Examination Report for European Application No. 16721025.1 dated Dec. 4, 2020.

European Examination Report for European Application No. 16721025.1 dated May 13, 2020.

J. Christopher Bauernfeind, Carotenoids as colorants and vitamin a precursors, Technological and nutritional applications, Academic press inc, New York, 1981, p. 65-71.

Japanese Official Decision of Refusal for Patent Application No. JP2017-554356, dated May 12, 2020.

Shokuhintokaihatsu, Food Processing and Ingredients, (2004) vol. 39, No. 11, p. 67-71.

Rachael Stuart, "Kraft to Remove Artificial Dyes from Mac and Cheese", https://www.foodista.com/blog/2013/11/02/kraft-to-remove-artificial-dyes-from-ma c-and-cheese, Nov. 2, 2013.

Australian Examination Report for Application No. 2016252280 dated Dec. 18, 2019.

Chinese Office Action for Application No. 201680022254.0 dated Apr. 3, 2020.

Chinese Office Action for Application No. 201680022254.0 dated Jan. 6, 2021.

Japanese Pre-Appeal Examination Report for Patent Application No. JP2017-554356, dated Oct. 21, 2020.

Ranken, Kill, et al., Food Industry Handbook, (BR), China Light Industry Press, Edition 01, 1st Printing, p. 127-128, Jan. 31, 2002.

Zhaoxia Li, Chinese Food Dictionary, Shanxi Science and Technology Press, Mar. 2012, Edition 01, 1st Printing, p. 749-753, Mar. 31, 2012.

Chinese Office Action for Application No. 201680022254.0 dated Jun. 2, 2021.

Office Action dated Sep. 18, 2019 for JP Application No. 2017-554356.

Australian Office Action for Application No. 2016252280 dated Dec. 18, 2019.

Brazilian Office Action for Application No. BR 11 2017 022070-9 dated Mar. 15, 2022.

Canadian Office Action for Application No. 2,981,360 dated Jun. 22, 2021.

Chinese Office Action for Application No. 201680022254.0 dated Sep. 3, 2021.

Japanese Office Action for Application No. 2020-149430 dated Sep. 7, 2021.

* cited by examiner

DRY-POWDERED CHEESE COMPOSITIONS WITH NATURALLY-DERIVED COLOR BLENDS, METHOD OF MAKING AND CHEESE PRODUCT

FIELD

The present specification generally relates to naturally-derived color, color blends, and powdered cheese compositions for producing cheese sauce, and more particularly, to naturally-derived color and color blends and powdered cheese compositions comprising the same.

TECHNICAL BACKGROUND

Typically, cheese powders include synthetically-derived colors and/or dyes to give the cheese a rich color that otherwise may be missing from a dehydrated cheese powder. However, consumers now desire that products have more natural ingredients and include fewer synthetically-derived colors, flavors, and preservatives. Although natural colorants are known, they can alter the taste of the cheese sauce, may cause the cheese sauce to be non-uniform in color, and/or may cause the cheese sauce to lack the desired creaminess and overall mouth feel that consumers expect.

Accordingly, a need exists for alternative naturally-derived colors, color blends including naturally-derived colors, and cheese powders with naturally-derived color which may be reconstituted to provide a colored cheese product.

SUMMARY

According to one embodiment, a dry powdered composition which may be reconstituted to provide a cheese product or cheese analog includes at least one cheese component or cheese analog and a color composition. The color composition includes from about 49.7% to about 87.1% curcumin compounds by weight based on a total amount of color in the composition; from about 2.1% to about 42.8% annatto carotenoids by weight based on the total amount of color in the composition; and from about 7.5% to about 10.8% paprika carotenoids by weight based on the total amount of color in the composition.

According to another embodiment, a dry powdered composition which may be reconstituted to provide a cheese product or cheese analog includes at least one cheese component or cheese analog and a color blend. The dry powdered composition includes from about 38.5 ppm to about 733.9 ppm curcumin compounds by weight based on the powdered composition, from about 3.6 ppm to about 165.7 ppm annatto carotenoids by weight based on the powdered composition, and from about 5.8 ppm to about 90.7 ppm paprika carotenoids by weight based on the powdered composition. An amount of curcumin compounds is greater than an amount of annatto carotenoids.

According to another embodiment, a method of making a dry powdered cheese composition includes mixing one or more cheese components with a color blend. The dry powdered composition includes from about 49.7% to about 87.1% curcumin compounds by weight based on a total amount of color in the composition; from about 2.1% to about 42.8% annatto carotenoids by weight based on the total amount of color in the composition; and from about 7.5% to about 10.8% paprika carotenoids by weight based on the total amount of color in the composition. The amount of colorant including the curcumin compounds, the annatto carotenoids, and the paprika carotenoids may be present in an amount from 47.9 ppm to about 990.3 ppm by weight based on the powdered composition. An amount of curcumin compounds is greater than an amount of annatto carotenoids.

According to another embodiment, a cheese product includes from about 38.5 ppm to about 733.9 ppm curcumin compounds by weight based on solids, from about 3.6 ppm to about 165.7 ppm annatto carotenoids by weight based on solids, and from about 5.8 ppm to about 90.7 ppm paprika carotenoids by weight based on solids. An amount of curcumin compounds is greater than an amount of annatto carotenoids. The cheese product is also substantially free of synthetically-derived colorants.

Additional features and advantages will be set forth in the detailed description which follows, and in part will be readily apparent to those skilled in the art from that description or recognized by practicing the embodiments described herein, including the detailed description which follows and the claims.

It is to be understood that both the foregoing general description and the following detailed description describe various aspects and embodiments and are intended to provide an overview or framework for understanding the nature and character of the claimed subject matter.

DETAILED DESCRIPTION

Reference will now be made in detail to various embodiments of naturally-derived color and powdered compositions which may be reconstituted to provide a cheese product including the same. The components of the powdered composition may generally include one or more cheese components and a color blend including a naturally-derived color composition. The color blend relies on synergistic amounts of naturally-derived colorants to provide a desired color without generating an undesirable taste profile or appearance. Accordingly, when the powdered composition is reconstituted to provide a cheese product, it has a taste and appearance similar to conventional cheese and cheese-flavored products that include synthetically-derived colorants and are desired by consumers. In various embodiments, a dry powdered composition which may be reconstituted to provide a cheese product or cheese analog includes at least one cheese component or cheese analog and a color blend. In some embodiments, the color blend may include from about 49.7% to about 87.1% curcumin compounds by weight based on a total amount of color in the composition; from about 2.1% to about 42.8% annatto carotenoids by weight based on the total amount of color in the composition; and from about 7.5% to about 10.8% paprika carotenoids by weight based on the total amount of color in the composition. In some embodiments, the dry powdered composition includes from about 38.5 ppm to about 733.9 ppm curcumin compounds by weight based on the powdered composition; from about 3.6 ppm to about 165.7 ppm annatto carotenoids by weight based on the powdered composition; and from about 5.8 ppm to about 90.7 ppm paprika carotenoids by weight based on the powdered composition. Various embodiments of color compositions, powdered compositions with the color composition, cheese products with the color composition, and methods of making the same will be described.

As used herein, a "wt %," "weight percent," or "percent by weight," unless specifically stated to the contrary, is based on the total weight of the total dry powdered composition. As used herein, "turmeric," "curcumin compounds," "annatto," and "paprika" include extracts, derivatives, and oleoresins formed from each of these components, including the carotenoids that can be extracted from each of these components.

Specific and preferred values disclosed for components, ingredients, additives, temperatures, times, and like aspects, and ranges thereof, are for illustration only. They do not exclude other defined values or other values within defined ranges. The compositions, apparatuses, and methods of the disclosure include those having any value or combination of the values, specific values, or ranges thereof described herein.

In various embodiments, the components of the powdered composition include one or more cheese components or cheese analogs and a color blend. The one or more cheese components can include, for example, a cheese or combination of cheeses, a dehydrated cheese powder, or one or more cheese-forming ingredients. Cheese components can include, for example, one or more milk-fat containing natural cheeses, curds, milk, protein, water, salt, lactic acid, and the like. Suitable cheeses can include, for example and without limitation, ricotta, cheddar, colby, swiss, muenster, monterey jack, havarti, brick, gouda, cream cheeses, cottage cheese, other soft cheeses, and the like. In some embodiments, one or more cheese analogs are substituted for at least a portion of the cheese components. In some embodiments, the cheese analog is a vegetable fat or a vegetable protein derived cheese analog. In some embodiments, all or some of the cheese components may be replaced with a process cheese, an imitation cheese, a cheese spread, and/or a cheese analog.

In various embodiments, the powdered composition is formed by first making a cheese slurry in a cooker and thereafter spray drying the cheese slurry to form the powdered composition. Cooking may be employed as a batch process, a semi-continuous process, or a continuous process. In such embodiments, the cheese slurry can be formed by mixing one or more cheese components in a cooker with cheese, one or more salts, and whey solids. The cheese can provide flavor, such as an aged cheddar taste, to the cheese. Cheese can be made, for example, according to the process described in U.S. Pat. No. 6,251,445, which is hereby incorporated by reference in its entirety.

Salts can include sodium chloride, potassium chloride, and emulsifying salts. Emulsifying salts help the cheese melt and form a smooth, melted cheese slurry. Emulsifying salts can include, by way of example and not limitation, trisodium citrate, disodium phosphate duohydrate, trisodium phosphate duodecahydrate, monosodium phosphate, sodium aluminum phosphate, sodium hexametaphosphate, dipotassium phosphate, tripotassium citrate, sodium potassium tartrate, monopotassium phosphate, monosodium citrate, monopotassium citrate, tetrasodium pyrophosphate, tetrapotassium pyrophosphate, sodium tripolyphosphate, sodium acid pyrophosphate, sodium tetrametaphosphate, and the like. The particular emulsifying salt(s) selected, and the quantities thereof, may vary depending on the cheese condition, processing conditions, or the particular embodiment. In various embodiments, monosodium phosphate, disodium phosphate duohydrate, sodium tripolyphosphate, and combinations thereof are used as emulsifying salts. In various embodiments, once the one or more cheese components in a cooker with cheese, one or more salts, and whey solids are mixed together, they are heated to a temperature from about 160° F. to about 300° F. In some embodiments, the cheese, one or more salts, and whey solids are heated to a temperature from about 170° F. to about 190° F.

In various embodiments, a wet whey mix is added to the mixture of the emulsifying salts, the cheese components, and cheese. Optionally, one or more additional flavors may be added. In some embodiments, the color blend is added to the cheese slurry with the wet whey mix, while in other embodiments, the color blend may be added to the cheese slurry in a separate step. In embodiments, the color blend can include curcumin compounds, annatto carotenoids, and paprika carotenoids, as will be discussed in greater detail hereinbelow. In various embodiments, the color blend includes synergistic amounts of curcumin compounds, annatto carotenoids, and paprika carotenoids such that the resultant reconstituted cheese product has a taste and appearance similar to conventional cheese products including synthetically-derived colorants, but without the addition of synthetically-derived colorants.

In various embodiments, once the components are mixed together in the cooker and heated to a temperature of at least 160° F., a thickening agent may be added to the cheese slurry to thicken the slurry. In some embodiments, an acid, such as, for example, citric acid or lactic acid, is added in place of, or in addition to, a thickening agent. The acid may help the dairy proteins in the slurry aggregate, which thickens the cheese slurry. The acid may also reduce the pH of the cheese slurry. In some embodiments, the pH of the composition may be decreased to between about 4.5 and about 6.

Thereafter, the components may be heated to a temperature sufficient to pasteurize the slurry and held at this temperature for at least about 2 minutes. In embodiments, the pasteurization temperature may be from about 180° F. to about 195° F. In other embodiments, a preservative may be added in place of or in addition to pasteurizing the slurry. The cheese slurry is then cooled and spray dried to form the dry powdered composition. For example, in some embodiments, a cooker is employed to bring the cheese slurry to a temperature of about 185° F., hold the cheese slurry at that temperature for about two minutes to pasteurize the cheese slurry, and then allow the cheese slurry to cool to about 80° F. before it is spray dried. In some embodiments, the cooled cheese slurry can be dried using freeze drying, centrifugation, nanofiltration, reverse osmosis, drum drying, extrusion, or the like.

In other embodiments, the components of the dry powdered composition can be mixed by dry blending. In embodiments in which the components are dry blended together, each of the components, including the cheese components, the color blend, and any additional components, such as whey and/or flavors, can be provided in dry powder form and blended to uniformly distribute the components in the mixture.

Regardless of how the components are blended to form the dry powdered composition, in various embodiments, the dry powdered composition includes a moisture content from about 3 to about 6%, a fat content from about 5 to about 30%, and a salt content from about 5 to about 15%. In some embodiments, the dry powdered composition includes a moisture content from about 3 to about 4.75%, a fat content from about 15% to about 20%, and a salt content from about 7.6 to about 9.2%.

In various embodiments, the color blend includes a colorant portion, and may also include one or more additives. The colorant portion includes curcumin compounds, annatto carotenoids, and paprika carotenoids. In various embodiments, the dry powdered composition includes a colorant portion (including the curcumin compounds, the annatto carotenoids, and the paprika carotenoids) in an amount from about 47.9 ppm to about 990.3 ppm by weight based on the powdered composition. In some embodiments, the color is present in an amount from about 72.9 ppm to about 865.2 ppm. In some embodiments, the color is present in an amount from about 97.9 ppm to about 740.0 ppm.

In various embodiments, in addition to color (e.g., the colorant portion), the color blend includes one or more carriers, antioxidants, processing aids, and the like. The carriers included in the color blend can include, by way of example and not limitation, suspending agents, pH adjusting agents, antioxidants, emulsifiers, and the like. Carriers can include, for example, glucose syrup solids, modified food starch, sugar, potassium carbonate, maltodextrin, gum arabic, vegetable oils, glycol, glycerin, and the like. Suitable pH adjusting agents include potassium hydroxide, sodium ascorbate, sodium hydroxide, another base, and the like. Antioxidants can include, for example, rosemary extract, tocopherol, sodium ascorbate, butylated hydroxyanisole (BHA), butylated hydroxytoluene (BHT), tert-butylhydroquinone (TBHQ), and the like. In various embodiments, the color blend can include up to about 90%, up to about 95%, or up to about 99% of one or more carriers and from about 2% to about 10%, from about 3% to about 10%, or from about 5% to about 10% colorants. In some embodiments, the color blend can include greater than about 65%, greater than about 70%, greater than about 75%, or greater than about 80% of one or more carriers. For example, embodiments may include from about 65% to about 99% or from 75% to about 95% carriers. In particular embodiments, the color blend may include from about 0% to about 5% antioxidants or from about 0% to about 3% antioxidants. The color blend may further include from about 0% to about 5% processing aids or from about 1% to about 4% processing aids.

In various embodiments, the dry powdered composition includes from about 38.5 ppm to about 733.9 ppm curcumin compounds by weight based on the powdered composition. Some embodiments include from about 56.6 ppm to about 643.7 curcumin compounds by weight based on the powdered composition. Still other embodiments include from about 74.6 ppm to about 553.5 ppm curcumin compounds by weight based on the powdered composition.

In various embodiments, the dry powdered composition includes from about 3.6 ppm to about 165.7 ppm annatto carotenoids by weight based on the powdered composition. Some embodiments include from about 8.5 ppm to about 141.1 ppm annatto carotenoids by weight based on the powdered composition. Still other embodiments include from about 13.4 ppm to about 116.4 ppm annatto carotenoids by weight based on the powdered composition.

In various embodiments, the dry powdered composition includes from about 5.8 ppm to about 90.7 ppm paprika carotenoids by weight based on the powdered composition. Some embodiments include from about 7.8 ppm to about 80.4 ppm paprika carotenoids by weight based on the powdered composition. Still other embodiments include from about 9.9 ppm to about 70.1 ppm paprika carotenoids by weight based on the powdered composition.

In various embodiments, the color includes from about 49.7% to about 87.1% curcumin compounds by weight of the total colorant portion of the color blend. In some embodiments, the color includes from about 61.1% to about 84% curcumin compounds by weight of the total colorant portion of the color blend. Still other embodiments include from about 69.2% to about 80.1% curcumin compounds by weight of the total colorant portion. Curcumin compounds included in the color blend can include, for example, bis-demethoxy-curcumin, demethoxy-curcumin, and cucumin. Curcumin compounds can be added as oleoresin turmeric, according to some embodiments. Various embodiments include curcumin compounds in an amount that is greater than the amount of annatto carotenoids. In some embodiments, curcumin compounds are present in an amount that is from about four times to about eleven times the amount of annatto carotenoids present by weight based on the powdered composition. In some embodiments, curcumin compounds are present in an amount that is from about four times to about five times the amount of annatto carotenoids present by weight based on the powdered composition. In some embodiments, curcumin compounds are present in an amount that is from about two times to about fifteen times the amount of annatto carotenoids present by weight based on the colorant portion. In some embodiments, curcumin compounds are present in an amount that is from about three times to about 8.5 times the amount of annatto carotenoids present by weight based on the colorant portion.

According to various embodiments, the colorant portion also includes from about 2.1% to about 42.8% annatto carotenoids by weight of the total colorant portion. In some embodiments, the colorant portion includes from about 5.5% to about 30.5% annatto carotenoids by weight of the total colorant portion. Still other embodiments include from about 9.7% to about 21.6% annatto carotenoids by weight of the total colorant portion. Annatto carotenoids included in the color blend can include, for example, norbixin annato carotenoids and bixin annatto carotenoids. In some embodiments, the annatto carotenoids include a mixture of norbixin and bixin. The mixture of norbixin and bixin can include greater than about 51% norbixin by weight of the mixture of norbixin and bixin, greater than about 75% norbixin by weight of the mixture of norbixin and bixin, or greater than about 90% norxibin by weight of the mixture of norbixin and bixin. According to various embodiments, norbixin can be formed by saponification of bixin. Some embodiments further include both cis- and trans-forms of bixin and/or norbixin. For example, in some embodiments, about 90% of the norbixin is cis-norbixin. However, it should be understood that embodiments employing only cis- or only trans-forms of bixin and/or norbixin are contemplated. Annatto carotenoids can be added as annatto extract, according to some embodiments.

The colorant portion further includes from about 7.5% to about 10.8% paprika carotenoids by weight of the total colorant portion, according to various embodiments. In some embodiments, the colorant portion includes from about 8.5% to about 10.5% paprika carotenoids by weight of the total colorant portion. Still other embodiments include from about 9.2% to about 10.1% paprika carotenoids by weight of the total colorant portion. Paprika carotenoids suitable for use in the color blend can include, by way of example and not limitation, capsorubin, neoxanthin, violaxanthin, capsanthin, lutein, zeaxanthin, cryptoxanthin, beta-carotene, alpha-carotene, lycopene, and the like. In some embodiments, the paprika carotenoids are saponified to reduce the complexity of the carotenoids. In particular, in some embodiments, the paprika carotenoids employed in the color blend are present in their free form, and the mixture is substantially free of monoesters and diesters for a range of fatty acids. Paprika carotenoids can be added as paprika oleoresin, according to some embodiments.

In various embodiments, the dry powdered composition can be reconstituted to provide a cheese product or a cheese analog, depending on the starting ingredients for the dry powdered composition. The reconstituted cheese product or cheese analog can be, for example, a cheese sauce, a substitute cheese sauce, or a cheese analog sauce. In various embodiments, the dry powdered composition can be reconstituted using a fat (e.g., butter, margarine, or the like) and a liquid (e.g., water, milk, or the like). However, in some embodiments, the dry powdered composition can be reconstituted using only a liquid. The dry powdered composition is mixed with the fat and/or liquid to provide a homogeneous cheese product or a cheese analog. In various embodiments, the dry powdered composition is present in an amount from about 10% to about 45% of the finished reconstituted cheese product or cheese analog, depending on the particular embodiment. In some embodiments, the dry powdered composition is present in an amount from about 15% to about 45% of the finished reconstituted cheese product or cheese analog. In some embodiments, the dry powdered composition is present in an amount from about 20% to about 35% of the finished reconstituted cheese product or cheese analog.

Accordingly, in various embodiments, a cheese product includes from about 38.5 ppm to about 733.9 ppm curcumin compounds by weight based on solids; from about 3.6 ppm to about 165.7 ppm annatto carotenoids by weight based on solids; and from about 5.8 ppm to about 90.7 ppm paprika carotenoids by weight based on solids. In such embodiments, the cheese product is substantially free of synthetically derived colorants and includes an amount of curcumin compounds that is greater than an amount of annatto carotenoids. In some embodiments, the cheese product includes from about 56.6 ppm to about 643.7 ppm curcumin compounds by weight based on solids; from about 8.5 ppm to about 141.1 ppm annatto carotenoids by weight based on solids; and from about 7.8 ppm to about 80.4 ppm paprika carotenoids by weight based on solids. Still other embodiments provide a cheese product including from about 74.6 ppm to about 553.5 ppm curcumin compounds by weight based on solids; from about 13.4 ppm to about 116.4 ppm annatto carotenoids by weight based on solids; and from about 9.9 ppm to about 70.1 ppm paprika carotenoids by weight based on solids.

The color blend, the dry powdered composition, and/or the cheese product of various embodiments described herein may be employed in various end uses, such as to flavor and/or color snack foods such as chips, crackers, and popcorn, cheese spreads or sauces, or the like. As but one example, the color blend, dry powdered composition, and/or the cheese product made from reconstituted dry powdered composition may be employed to make macaroni and cheese.

According to various embodiments, the reconstituted cheese sauce, substitute cheese sauce, or cheese analog sauce can be mixed with pasta. In various embodiments, the pasta may be made from wheat flour including but not limited to Hard Red Spring wheat flour, Durum wheat flour, Semolina wheat flour, whole wheat flour, and mixtures thereof. The pasta may be packaged with the dry powdered composition in a kit, according to some embodiments. In some embodiments, the dry powdered composition may be added to the uncooked pasta and the pasta and dry powdered composition can be hydrated together. In other embodiments, the dry powdered composition is reconstituted to form the cheese sauce, substitute cheese sauce, or cheese analog sauce and then mixed with cooked pasta to form the final pasta dish. In various embodiments, the cheese sauce, substitute cheese sauce, or cheese analog sauce are mixed with pasta to create a substantially homogeneous composition.

EXAMPLES

It is believed that the various embodiments described hereinabove will be further clarified by the following examples.

Example 1

Two powdered cheese compositions were made in a continuous cooker and spray dried. Each of the powdered cheese compositions was made by combining various cheese components along with cheese and emulsifying salts in a cooker. The mixture was initially heated to 175° F. A wet whey mix was then added to each mixture. The comparative color blend was added to the first mixture (Comparative Example 1 in Table 1), while a color blend according to various embodiments described herein was added to the second mixture (Example 1 in Table 1). Table 1 provides the colorants in % by weight of the color and in ppm by weight based on the powdered composition for each of Comparative Example 1 and Example 1.

TABLE 1

| | Color Blend Compositions | | | |
|---|---|---|---|---|
| | Comparative Example 1 | | Example 1 | |
| | % of color | ppm in final dry cheese powder | % of color | ppm in final dry cheese powder |
| Curcumin compounds | 32.89 | 51 | 75.35 | 141 |
| Annatto carotenoids | 61.14 | 95 | 14.92 | 71 |
| Paprika carotenoids | 5.97 | 9 | 9.72 | 20 |
| Total color | 100 | 156 | 100 | 232 |

The mixtures were brought to 180° F. Citric acid was added as a pH-modifying agent in each of the slurries. Each of the slurries was then heated to 185° F. and held for two minutes for pasteurization. The slurries were then cooled to less than about 80° F. and spray dried to generate the powdered cheese composition.

When reconstituted to produce a cheese product, the powdered cheese composition made using the color blend of comparative example 1 had a taste that was not desirable. Specifically, macaroni and cheese was prepared using 39.6 g of a powdered cheese composition including the color blend of comparative example 1 or 39.6 g of a powdered cheese composition including the color blend of example 1. Kraft Blue Box macaroni and cheese, which includes synthetically-derived colorants, was used as a control sample. For each macaroni and cheese sample, approximately 166.4 g of macaroni cooked in 6 cups of boiling water for about 7.5 minutes, stirring occasionally. The macaroni was drained immediately after cooking and shaken until excess water was drained from the macaroni. The macaroni was then returned to the pan.

Next, 4 tablespoons of margarine was added to the pan and stirred until the margarine was melted. One quarter cup 2% milk was added to the pan and the mixture was stirred. Then, 39.6 g of the powdered cheese composition was added to the pan and mixed. Samples (½ cup) of each macaroni and cheese preparation were provided to a consumer testing panel (N=256). Consumers were provided with a timed five minute break between tasting each sample, and water and unsalted crackers were used for palate cleansing prior to tasting each sample. Consumer ratings for overall liking and bitterness intensity are provided in Table 2.

TABLE 2

Consumer Testing Results

| | Overall Liking | Bitterness Intensity |
|---|---|---|
| Control | 6.53 | 3.61 |
| Comparative Example 1 | 6.27 | 4.0 |
| Example 1 | 6.76 | 3.31 |

As shown in Table 2, the macaroni and cheese sample including a cheese sauce reconstituted from a dry cheese powder including the color blend of example 1 had a greater overall liking than the control and the macaroni and cheese sample including a cheese sauce reconstituted from a dry cheese powder including the color blend of comparative example 1. Moreover, consumers rated the macaroni and cheese sample including a cheese sauce reconstituted from a dry cheese powder including the color blend of comparative example 1 lower than the control sample in overall liking. Regarding bitterness, consumers rated the macaroni and cheese sample including a cheese sauce reconstituted from a dry cheese powder including the color blend of example 1 as having a lower bitterness intensity than both the control and the macaroni and cheese sample including a cheese sauce reconstituted from a dry cheese powder including the color blend of comparative example 1. Consumers also identified the macaroni and cheese sample including a cheese sauce reconstituted from a dry cheese powder including the color blend of comparative example 1 as having a greater bitterness intensity than the control sample. In particular, the powdered cheese composition made using the color blend of example 1 can be reconstituted into a cheese product having a similar or even improved taste and appearance as a conventional reconstituted cheese product made from a powdered cheese composition that includes synthetically-derived colorants.

It should now be understood that embodiments of the present disclosure enable a dry powdered composition to be colored using naturally-derived colorants while retaining the taste and appearance similar to conventional cheese products including synthetically-derived colorants and desired by consumers. Moreover, various embodiments enable the dry powdered composition to be made by blending the color blend with one or more cheese components. The dry powdered composition can be reconstituted to form a processed cheese product when combined with water or milk, for example. Other advantages will be appreciated by one skilled in the art.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A dry powdered composition which may be reconstituted to provide a cheese product or cheese analog comprising:
   at least one cheese component or cheese analog; and
   a color composition comprising:
      from about 49.7% to about 87.1% curcumin compounds by weight based on a total amount of a color portion of the color composition;
      from about 2.1% to about 42.8% annatto carotenoids by weight based on the total amount of the color portion of the color composition; and
      from about 7.5% to about 10.8% paprika carotenoids by weight based on the total amount of the color portion of the color composition,
   wherein the curcumin compounds are present in an amount from about 2 to about 15 times the amount of annatto carotenoids by weight, and the annatto carotenoids comprise greater than about 51% norbixin by weight.

2. The dry powdered composition of claim 1, wherein the color composition comprises:
   from about 61.1% to about 84% curcumin compounds by weight based on the total amount of the color portion of the color composition;
   from about 5.5% to about 30.5% annatto carotenoids by weight based on the total amount of the color portion of the color composition; and
   from about 8.5% to about 10.5% paprika carotenoids by weight based on the total amount of the color portion of the color composition.

3. The dry powdered composition of claim 2, wherein the color composition comprises:
   from about 69.2% to about 80.1% curcumin compounds by weight based on the total amount of the color portion of the color composition;
   from about 9.7% to about 21.6% annatto carotenoids by weight based on the total amount of the color portion of the color composition; and
   from about 9.2% to about 10.1% paprika carotenoids by weight based on the total amount of the color portion of the color composition.

4. The dry powdered composition of claim 1, wherein the curcumin compounds are present in an amount from about 3 to about 8.5 times the amount of annatto carotenoids by weight.

5. The dry powdered composition of claim 1, wherein the color composition is free of synthetically-derived colorants.

6. A dry powdered composition which may be reconstituted to provide a cheese product or cheese analog comprising:
   at least one cheese component or cheese analog; and
   a color blend comprising:
      from about 38.5 ppm to about 733.9 ppm curcumin compounds by weight based on the powdered composition;
      from about 3.6 ppm to about 165.7 ppm annatto carotenoids by weight based on the powdered composition; and
      from about 5.8 ppm to about 90.7 ppm paprika carotenoids by weight based on the powdered composition,
   wherein the curcumin compounds are present in an amount from about 2 to about 15 times the amount of annatto carotenoids by weight, and the annatto carotenoids comprise greater than about 51% norbixin by weight.

7. The dry powdered composition of claim 6, wherein the color blend is free of synthetically-derived colorants.

8. The dry powdered composition of claim 6, wherein the color blend comprises:
   from about 56.6 ppm to about 643.7 ppm curcumin compounds by weight based on the powdered composition;

from about 8.5 ppm to about 141.1 ppm annatto carotenoids by weight based on the powdered composition; and from about 7.8 ppm to about 80.4 ppm paprika carotenoids by weight based on the powdered composition.

9. The dry powdered composition of claim 6, wherein the color blend comprises:
from about 74.6 ppm to about 553.5 ppm curcumin compounds by weight based on the powdered composition;
from about 13.4 ppm to about 116.4 ppm annatto carotenoids by weight based on the powdered composition; and
from about 9.9 ppm to about 70.1 ppm paprika carotenoids by weight based on the powdered composition.

10. The dry powdered composition of claim 6, wherein the color blend further comprises one or more carriers, antioxidants, or processing aids.

11. A method of making a dry powdered cheese composition comprising:
mixing one or more cheese components with a color blend comprising:
from about 49.7% to about 87.1% curcumin compounds by weight based on a total amount of a color portion of the color blend;
from about 2.1% to about 42.8% annatto carotenoids by weight based on the total amount of the color portion of the color blend; and
from about 7.5% to about 10.8% paprika carotenoids by weight based on the total amount of the color portion of the color blend;
wherein the color portion of the color blend including the curcumin compounds, the annatto carotenoids, and the paprika carotenoids is present in an amount from 47.9 ppm to about 990.3 ppm by weight based on the powdered composition, the curcumin compounds are present in an amount from about 2 to about 15 times the amount of annatto carotenoids by weight, and the annatto carotenoids comprise greater than about 51% norbixin by weight.

12. The method of claim 11, wherein mixing the one or more cheese components with the color blend comprises:
forming a cheese slurry including the one or more cheese components, the color blend, and one or more salts;
cooling the cheese slurry; and
spray drying the cheese slurry to form the dry powdered cheese composition.

13. The method of claim 12, wherein the one or more salts comprise at least one of sodium chloride, potassium chloride, monosodium phosphate, disodium phosphate duohydrate, sodium tripolyphosphate, trisodium citrate, and combinations thereof.

14. The method of claim 12, wherein forming the cheese slurry comprises mixing the one or more cheese components, the color blend, and the one or more salts in a cooker.

15. The method of claim 11, wherein mixing the one or more cheese components with the color blend comprises mixing dehydrated cheese powder with the color blend, wherein the color blend is in the form of a powder, to form the dry powdered cheese composition.

16. The method of claim 11, wherein the color blend comprises from about 8.5 ppm to about 141.1 ppm annatto carotenoids by weight based on the powdered composition.

17. The method of claim 16, wherein the color blend comprises from about 13.4 ppm to about 116.4 ppm annatto carotenoids by weight based on the powdered composition.

18. A cheese product comprising:
from about 38.5 ppm to about 733.9 ppm curcumin compounds by weight based on total solids in the cheese product;
from about 3.6 ppm to about 165.7 ppm annatto carotenoids by weight based on total solids in the cheese product; and
from about 5.8 ppm to about 90.7 ppm paprika carotenoids by weight based on total solids in the cheese product,
wherein the color blend is free of synthetically derived colorants, the curcumin compounds are present in an amount from about 2 to about 15 times the amount of annatto carotenoids by weight, and the annatto carotenoids comprise greater than about 51% norbixin by weight.

19. The cheese product of claim 18, wherein the cheese product comprises:
from about 56.6 ppm to about 643.7 ppm curcumin compounds by weight based on total solids in the cheese product;
from about 8.5 ppm to about 141.1 ppm annatto carotenoids by weight based on total solids in the cheese product; and
from about 7.8 ppm to about 80.4 ppm paprika carotenoids by weight based on total solids in the cheese product.

20. The cheese product of claim 19, wherein the cheese product comprises:
from about 74.6 ppm to about 553.5 ppm curcumin compounds by weight based on total solids in the cheese product;
from about 13.4 ppm to about 116.4 ppm annatto carotenoids by weight based on total solids in the cheese product; and
from about 9.9 ppm to about 70.1 ppm paprika carotenoids by weight based on total solids in the cheese product.

21. The cheese product of claim 18, wherein the annatto carotenoids comprise greater than about 75% norbixin by weight.

22. The cheese product of claim 21, wherein the annatto carotenoids comprise greater than about 90% norbixin by weight.

23. A pasta product comprising:
cooked pasta; and
a cheese product or cheese analog provided by reconstituting the dry powdered composition of claim 1 with a liquid and/or fat.

24. The pasta product of claim 23, wherein the cheese product or cheese analog comprises from about 10% to about 45% of the dry powdered composition of claim 1.

25. The pasta product of claim 23, wherein the liquid is milk or water.

26. A packaged pasta kit comprising:
uncooked pasta; and
the dry powdered composition of claim 1.

* * * * *